United States Patent [19]

Gandy et al.

[11] 4,050,948
[45] Sept. 27, 1977

[54] METHOD OF MAKING LIGHTWEIGHT CEMENT SLURRIES AND THEIR USES

[75] Inventors: Richard G. Gandy, Grand Prairie; Vincent Cohee White, Arlington, both of Tex.

[73] Assignee: BJ-Hughes Inc., Long Beach, Calif.

[21] Appl. No.: 669,587

[22] Filed: Mar. 23, 1976

[51] Int. Cl.² .................................................. C04B 7/35
[52] U.S. Cl. ......................................... 106/76; 106/89
[58] Field of Search .................................. 106/76, 89

[56] References Cited

U.S. PATENT DOCUMENTS

| 1,951,186 | 3/1934 | De Bow | 106/76 |
| 2,336,723 | 12/1943 | Drummond | 106/76 |
| 2,695,850 | 11/1954 | Lorenz | 106/76 |
| 3,902,911 | 9/1975 | Messenger | 106/76 |

*Primary Examiner*—J. Poer
*Attorney, Agent, or Firm*—John O. Evans, Jr.

[57] ABSTRACT

A method of making lightweight cement slurry which involves dissolving sodium metasilicate and an activator in mix water, and thereafter mixing Portland cement therewith. The activator may be calcium chloride, calcium formate, calcium oxide, a water soluble calcium compound or a mixture thereof. The lightweight cement slurry so formed may be used for cementing well pipe in wells or for casting lightweight structural members, such as board, columns, and the like.

7 Claims, No Drawings

METHOD OF MAKING LIGHTWEIGHT CEMENT SLURRIES AND THEIR USES

BACKGROUND OF THE INVENTION

1. Field of the Invention

This invention relates to a method of making lightweight cement slurry and to methods of using the slurry so prepared.

2. Description of the Prior Art

When casing is cemented in a well it is a common practice to use two different cementing mixtures to fill or partially fill the annular space between the casing and the well bore. The "tail-in" mixture is placed in the bottom 100 to 1000 feet of the annulus and the "lead" or "filler" mixture is placed in the annulus above the tail-in mixture and extending upwards as far as it is desired to fill and seal the annulus.

The purpose of the tail-in mixture is to obtain a good, strong seal around the bottom of the casing and extending up over the productive zone. If the well is to be drilled deeper, the strong tail-in mixture serves the purpose of securing the bottom of the casing against the severe hammering action of the drill pipe as the well is drilled deeper. If the well has been drilled to its intended depth, the strong tail-in mixture provides a strong cement sheath that will withstand the shock of perforating the pipe and the high pressures involved in stimulating the productive formation such as by fracturing or acidizing.

The purposes of the lead or filler cementing mixture are to support the casing, prevent caving of the well bore, confine fluids to the formation in which they occur and prevent migration of fluids. For these purposes, a high strength cement is not necessary. Compressive strength of 50 psi is considered adequate for a filler slurry.

Heretofore a mixture of Portland cement and 1 to 3% anhydrous sodium metasilicate by weight of cement has been used as an economical and very satisfactory filler mixture in the cementing of wells. In addition to being economical, this mixture has a number of other advantages. The slurries can be mixed to a density as low as 11.0 pounds per gallon and yet provide acceptable strength when cured. The strength of the cured slurries is higher than the strength of most other cementing mixtures mixed to the same density. Such slurries permit a variable water ratio - the amount of mixing water used is not critical. For example, a blend of Portland cement with 2% anhydrous sodium metasilicate additive can be mixed at densities from 11.9 to more than 13.0 lbs. per gallon simply by varying the amount of mixing water.

One of the biggest advantages of the cement-sodium metasilicate mixtures is in their application to cementing on off-shore platforms. There seems to always be a shortage of storage space for dry cement on off-shore platforms. To best utilize the available storage space, it is necessary to store dry cement blends that have the highest yield. The yield of a cementing mixture is the number of cubic feet of slurry obtained per 94 pounds of the dry cement or dry cement blend. Since the known mixtures have a higher yield than other mixtures they are used extensively on off-shore platforms.

In the past, cementing mixtures have usually been made from a dry-blend of the cement and the additives needed for the particular mixture being used. This procedure has the advantage of needing only the addition of water to make the cement slurry as it is pumped into the well. However, there are also disadvantages to the use of dry-blended mixtures. If additives are dry-blended, the resulting mixture can be used only for the particular cementing job for which it was originally designed. For example, a cementing mixture designed to cement casing in a well at 10,000 feet may contain 0.5% lignosulfonate retarder to give the slurry the desired thickening time for that particular job. If it is later found that an inaccurate bottom hole temperature was used as the basis for the amount of retarder, it may then be decided that 0.8% retarder is actually needed. In this example, the procedure would be to prepare a new dry-blend of cement containing 0.8% retarder. The original dry-blend would then be wasted. For this reason it has become desirable to supply many of the additives used in cementing wells as additives that can be added to the mixing water rather than dry-blended with the cement. Additives intended for addition to the mixing water are preferably liquid rather than dry materials. Liquid additives dissolve more readily in the mixing water. Also, if a cementing mixture is to be mixed continuously as it is pumped into the well, it may be necessary to proportion the additive continuously into the mixing water. And it is much easier and more accurate to proportion a liquid additive than a dry one.

The slurries previously referred to have had a peculiar disadvantage in that the anhydrous sodium metasilicate must be dry-blended with cement. If the additive is added to the mixing water, the desired results of a uniform, non-settling slurry will not be obtained.

SUMMARY OF THE INVENTION

This invention makes it possible to obtain the desirable effects of anhydrous sodium metasilicate even if it is added to the cement mixing water.

The object is accomplished by using an activator in conjunction with the metasilicate. The activator may be calcium chloride, calcium formate, calcium oxide or any water-soluble calcium compound and mixture thereof, or a water solution of any of these compounds. The sodium metasilicate may be used as the dry anhydrous material or as a water solution. The sodium metasilicate and the activator may both be added to the mixing water as dry materials, both as solutions or as a combination of one dry and one a solution.

The invention resides in a method of making lightweight cement slurry capable of setting to provide a lightweight set cementitious composition, the method consisting essentially of: forming a solution of sodium metasilicate and an activator in mix water and, thereafter, mixing Portland cement and the solution to provide a cement slurry. The proportions of the solution and the Portland cement are selected to provide a slurry having a density of about 11 to 14 pounds per gallon of slurry. The amount of the sodium metasilicate employed is from about 1% to 3% by weight of the weight of the Portland cement, and the amount of the activator is from about 1% to 3% by weight of the weight of the Portland cement.

DESCRIPTION OF THE PREFERRED EMBODIMENTS

Using API Class H cement and 105% mixing water by weight of cement, slurries were prepared using a Waring Blender as the mixer. The water was placed in the blender jar. The activator (if used) was added to the mixing water and mixed at low speed for 1 minute. Anhydrous sodium metasilicate was then added to the water and mixed at low speed for 1 minute. The dry cement was then added, in 15 seconds or less, to the water as stirring was continued at low speed. When all of the cement had been added the stirring was increased to high speed for 35 seconds. The mixture was then placed in an atmospheric pressure consistometer and stirred for 20 minutes. The mixture was then restirred for 35 seconds at high speed on the Waring Blender and 250 mls. were poured into a 250-ml., graduated cylinder. The cylinder was sealed with a piece of sheet plastic and allowed to stand for two hours. After two hours the amount of free water collected at the top of the cement slurry in the cylinder was measured. The amount of free water was expressed as "Volume %" of the 250 mls. of slurry. This procedure is the API Free Water Content Procedure as it appears on page 6 of API RP 10B dated January 1974. Results of these tests appear in Table I. In Table I and in tables of results reported later, the following abbreviations are used.

| Abbreviation | Meaning |
| --- | --- |
| ASM | (dry) anhydrous sodium metasilicate |
| 35% SMS | 35% solution of sodium metasilicate |
| CC | (dry) anhydrous calcium chloride |
| 40% CC | 40% solution of calcium chloride |
| CF | (dry) calcium formate |
| 15% CF | 15% solution of calcium formate |
| CO | (dry) calcium oxide |
| 20% CO | 20% solution of calcium oxide |

Where referred to herein, the sack of cement (sk.cem.) contains 94 lbs. of cement.

TABLE I

| | | | | Class H Cement + 105% Water by Weight of Cement | | | |
| --- | --- | --- | --- | --- | --- | --- | --- |
| Test No. | Activator Name | Activator Concentration % by Wt. of Cement | ASM % by Wt. of Cement | Consistency Units of Consistency | | | Free Water Volume % |
| | | | | 1 min | 10 min | 20 min | |
| On Test No. 1 the ASM was dry blended with the cement | | | | | | | |
| 1. | None | | 2.0 | 5 | 5 | 5 | 0.6 |
| 2. | None | | 2.0 | 1 | 2 | 1 | 32.0 |
| 3. | CC | 2.0 | 2.0 | 5 | 5 | 5 | 0.6 |
| 4. | CF | 2.0 | 2.0 | 3 | 4 | 4 | 1.1 |
| 5. | CO | 2.0 | 2.0 | 6 | 6 | 6 | 0.6 |

Test No. 1 shows the desirable consistency and free water properties obtained by dry-blending 2% ASM with cement then mixing the dry blend with water.

Test No. 2 shows that if the ASM is first added to the mixing water then the cement is added, the resulting slurry has the undesirable properties of low consistency and a very high free water.

Test No.'s 3, 4 and 5 show that if any one of the three activators listed is added to the mixing water, then the ASM is added that the resulting slurry has desirable properties of consistency and free water.

For the next set of tests, a procedure similar to that used for the tests reported in Table I was used except that solutions of the sodium metasilicate and of the activators were used instead of the dry materials. Results of these tests are given in Table II.

TABLE II

| | | | | Class H Cement + 105% Water by Weight of Cement | | | |
| --- | --- | --- | --- | --- | --- | --- | --- |
| Test No. | Activator Name | Activator Concentration gals per 100 sk cem | 35% SMS gals per 100 sk cem | Consistency Units of Consistency | | | Free Water Volume % |
| | | | | 1 min | 10 min | 20 min | |
| 6. | None | | 46 | 2 | 2 | 2 | 30.4 |
| 7. | 40%CC | 30 | 46 | 4 | 5 | 5 | 1.0 |
| 8. | 15%CF | 60 | 46 | 3 | 4 | 4 | 1.8 |
| 9. | 20%CO | 30 | 46 | 3 | 3 | 3 | 2.0 |

Test No. 6. shows that if only the sodium metasilicate solution is added, without an activator, the resulting slurry is undesirably thin and has a very high free water content.

Test No.'s 7, 8 and 9 show that if an activator, in the form of a solution, is added to the mixing water along with the solution of sodium metasilicate the resulting slurry has desirable consistency and free water properties. In determining whether or not a given cementing mixture is satisfactory for use in cementing wells, two of the properties that should be considered are thickening time and compressive strength. Thickening time is the time required for a cement slurry of a given composition to each a consistency of 100 units of consistency (Uc), determined by methods outlined in API RP 10B. Compressive strength is the degree of resistance of a material to force acting along one of the axes in a manner tending to crush it. Thickening time and strength were determined on slurries containing 35% SMS and one of the activators, 4% CC. The amounts of these two solutions were varied along with a variation in the amount of mixing water used. Table III gives results of thickening time tests and Table IV gives results of compressive strength tests. In both of these tables the results are compared with the results of mixtures prepared by dry-blending ASM with the cement. Where 35% SMS and 40% CC were used, these solutions were added to the mix water prior to the addition of the cement.

TABLE III

Class H cement, mixing water as shown Concentration of ASM is given in % by weight of cement. Concentration of 35% SMS and of 40% CC is given in gallons per 100 sacks of cement. Thickening time is given in hours: minutes to reach 100 units of consistency.

| Water % by wt. of cem. | ASM % | 35% SMS gals. | 40% CC gals | Thickening Time | |
|---|---|---|---|---|---|
| | | | | API Schedule 2 91° F. | API Schedule 3 103° F. |
| 65.0 | 1.0 | | | 4:38 | 2:26 |
| 65.0 | | 23 | 20 | | 4:25 |
| 105.0 | 2.0 | | | 7:00+ | 7:00+ |
| 105.0 | | 46 | 30 | 7:00+ | 7:00+ |
| 155.0 | 3.0 | | | 7:00+ | 7:00+ |
| 155.0 | | 68 | 40 | 7:00+ | 7:00+ |

TABLE IV

Class H Cement, mixing water as shown Concentration of ASM is given in % by weight of cement. Concentration of 35% SMS and of 40% CC is given in gallons per 100 sacks of cement. Compressive strength is reported as pounds per square inch.

| Water % by wt. of cem. | ASM % | 35% SMS gals | 40% CC gals | Compressive Strength, psi 24 Hours | |
|---|---|---|---|---|---|
| | | | | 80° F. | 120° F. |
| 65.0 | 1.0 | | | 698 | 1560 |
| 65.0 | | 23 | 20 | 701 | 1075 |
| 105.0 | 2.0 | | | 238 | 483 |
| 105.0 | | 46 | 30 | 171 | 324 |
| 155.0 | 3.0 | | | 85 | 158 |
| 155.0 | | 68 | 40 | 106 | 128 |

Table III and IV show that the use of sodium metasilicate and calcium chloride as solutions added to the mixing water of a cement slurry gives thickening time and strength results similar to those obtained by dry-blending ASM. The preferred solution strength of anhydrous sodium metasilicate is 35%. This concentration is close to the maximum amount that can be dissolved and maintained as a solution. The preferred liquid activator is 40% calcium chloride solution. However, solutions of lower concentrations may be used.

Portland cements, in addition to API Class H cement referred to hereinbefore may be used in the practice of this invention, such as Class A, B, C or G, as designated in accordance with the classification of the American Petroleum Institute.

Other additives may be incorporated in the cement slurries of this invention, such, for example, as retarding or accelerating agents, thickening agents, lost circulation materials, and slurry density reducing substances, such as bentonite and pozzolan.

In cementing well pipe in a well, using the lightweight cement slurries described herein, the slurry is introduced into the annulus between a well pipe and the bore of a well, or between a well pipe and a surrounding pipe or casing, and permitted to set in the annulus, to thereby bond the pipe to the bore of the well. The slurry may be introduced into the annulus in any described way, as by pumping the slurry down the pipe and allowing it to flow upward into the annulus, or by forcing it into the annulus through perforations in the pipe. These slurries preferably are used as lead or filler mixtures, but they may provide the entire volume of cement used in the pipe-cementing operation.

The slurries of the invention may be used to cast structural numbers such as boards and columns, in which case they may contain lightweight fillers, such as fibers for added strength.

The foregoing description is to be taken as merely illustrative of the invention and not as limitative, the scope of the invention being defined in the claims. Variations will occur to those skilled in the art without departing from the invention.

Liquid sodium silicates may be added to the mix water in place of sodium metasilicate.

Seawater or ocean water may be used as the mix water in the practice of this invention. When seawater is used, the water soluble calcium compound may be omitted, and the sodium silicate dissolved in the seawater prior to the mixing of the Portland cement therein.

We claim:

1. A method of making lightweight cement slurry capable of setting to provide a lightweight set cementitious composition, the method consisting essentially of forming a solution of sodium metasilicate and an activator in mix water and, thereafter, mixing Portland cement and said solution to provide a cement slurry, the proportions of said solution and said Portland cement being selected to provide a slurry having a density of about 11 to 14 pounds per gallon of slurry, and wherein the amount of said sodium metasilicate is from about 1% to 3% by weight of the weight of said Portland cement, and the amount of said activator is from about 1% to 3% by weight of the weight of said Portland cement.

2. A method of making lightweight cement slurry as defined in claim 1, wherein said activator comprises a water soluble calcium compound.

3. A method of making lightweight cement slurry as defined in claim 1, wherein said activator is selected from the group of activators consisting of calcium chloride, calcium formate, calcium oxide, and mixtures thereof.

4. A method of making a lightweight cement slurry as defined in claim 1, wherein the slurry has a density of from 12 to 13 pounds per gallon of slurry.

5. A method of making lightweight cement slurry as defined in claim 3, wherein said sodium metasilicate is dissolved in said mix water in the form of an aqueous solution of sodium metasilicate.

6. A method of making lightweight cement slurry as defined in claim 3, wherein said activator is dissolved in said mix water in the form of an aqueous solution of said activator.

7. A method of making lightweight cement slurry capable of setting to provide a lightweight set cementitious composition, the method consisting essentially of forming a solution of sodium metasilicate in seawater and, thereafter, mixing Portland cement with said solution to provide a cement slurry, the proportions of said solution and said Portland cement being selected to provide a slurry having a density of about 11 to 14 pounds per gallon of slurry, and wherein the amount of said sodium metasilicate is from about 1% to 3% by weight of the weight of said Portland cement.

* * * * *